Nov. 3, 1964

C. B. KREKELER 3,155,225

LATERAL PLATE PUSHER-TYPE CONVEYOR

Filed Nov. 19, 1962

INVENTOR.
CLAUDE B. KREKELER,
BY
*Yungblut, Melville, Strasser & Foster*
ATTORNEYS.

Nov. 3, 1964

C. B. KREKELER 3,155,225

LATERAL PLATE PUSHER-TYPE CONVEYOR

Filed Nov. 19, 1962

INVENTOR.
CLAUDE B. KREKELER,
BY
Yungblut, Melville, Strasser & Foster
ATTORNEYS.

Nov. 3, 1964  C. B. KREKELER  3,155,225
LATERAL PLATE PUSHER-TYPE CONVEYOR
Filed Nov. 19, 1962  6 Sheets-Sheet 3

INVENTOR.
CLAUDE B. KREKELER,
BY
Jungblut, Melville, Strauss & Foster
ATTORNEYS.

United States Patent Office 3,155,225
Patented Nov. 3, 1964

3,155,225
LATERAL PLATE PUSHER-TYPE CONVEYOR
Claude B. Krekeler, Cincinnati, Ohio, assignor to The Cincinnati Mine Machinery Co., Cincinnati, Ohio, a corporation of Ohio
Filed Nov. 19, 1962, Ser. No. 238,402
11 Claims. (Cl. 198—171)

The invention, although its utility is not necessarily so restricted, is of especial value in the provision of conveyors for mining machinery.

As is well known, mining machines have been developed which carry at their forward ends powered cutting devices of various forms. In one form, a pair of movable arms support a forward shaft in a horizontal position, and a series of chains equipped with cutter bits are driven over sprockets located on the shaft. A cut is made into the face of a seam of coal, and the cutting means can be moved up and down and laterally so as to make a cut of sufficient size to permit the mining machine to travel forwardly in the "room." Other types of mining machines may have forward cutters mounted upon elements extending radially from a pair of power driven shafts. Still other types may have separate cutting assemblies mounted upon arms which can be swung toward and away from each other as well as up and down. The specific nature of the mining machine and its cutting elements does not form a limitation on this invention.

The coal which is cut is moved rearwardly of the cutting elements and is carried by conveying means across the top of the machine and to a tail conveyor extending rearwardly of the machine. A single mining machine may incorporate several conveyors in its construction, the conveyors acting successively to transport the coal. The function of the tail conveyor is to deliver the cut coal to means which will remove it from the room. These means may be mine cars, a portable belt conveyor, or independent buggies to receive the coal, carry it out of the room and to an "entry" of the mine wherein there will be coal moving equipment which will carry the coal toward or to the usual tipple.

The form of the conveyor or conveyors most frequently employed as part of mining machinery comprises an elongated platform with upstanding side guides or "flanges." A chain is driven the length of the platform and substantially centrally thereof, returning over sprockets at either end of the platform. Rigid horizontal members hereinafter called "flights" are fastened to the chain at intervals on each side of it; and as the chain is driven, these flights push the coal along the platform. This type of construction may be employed for any or all of the conveyors incorporated in the mining machine.

But, by reason of its above described function, the rearwardly projecting portion of the tail conveyor must be capable of both lateral and vertical movement. The platform for the tail conveyor is usually formed in two parts which are pivoted to each other for movement in a substantially horizontal plane. The entire tail conveyor with its frame may be pivoted at the forward end to permit up and down adjustment of the trailing end. Such movements of the tail conveyor are required to deliver the coal to a desired point despite changes in the orientation of the mining machine as it advances into the room, or when shifting the delivery point from one buggy to another adjacent buggy. The conveyor chain not only must have flexibility for bending in a vertical plane, so as to follow the platform and pass over the sprockets, but also must have flexibility in a horizontal plane so as to be able to follow angularly related parts of the platform.

Hitherto the chains have been made up of blocks or "links" and interconnecting "plates," these elements being held together by horizontally disposed pintles. The flights have been rigidly attached to or formed as a part of certain plates in the chain. Between the points of attachment of the flights, certain of the blocks or links have been made in two parts pivoted to each other by vertical pintles so that the chain can flex in the horizontal plane. This construction entails certain difficulties, and is not particularly strong because of the necessarily abbreviated length and diameter of the vertical pintles. On the other hand, it is not feasible merely to construct a chain of parts which are so loosely fitting and are characterized by so much lost motion that the chain can flex in the horizontal plane.

It is a primary object of this invention to provide an improved conveyor means for use on continuous mining and loading machines, and in other situations presenting the same problems.

It is an object of the invention to provide an improved conveyor chain with flights extending at regular intervals from both sides of the chain, the chain being capable of turning or bending in the horizontal and vertical planes.

It is an object of the invention to provide an improved conveyor chain of the type indicated, which is capable of running over a standard block chain type of sprocket.

It is an object of the invention to provide a conveyor chain in which each link is as strong and wear-resistant as each other link, and to do so without using the conventional, two-part "universal" blocks above described.

It is an object of the invention to provide a conveyor chain which has all of the advantages already recited, but in which the various parts maintain a close relationship with each other within reasonable tolerances, so that wear is not produced by a loose fitting of the several chain elements.

These and other objects of the invention which will be set forth hereinafter or will be apparent to one skilled in the art upon reading these specifications, are accomplished by that construction and arrangement of parts of which an exemplary embodiment will now be described. Reference is made to the accompanying drawings wherein.

In the practice of this invention, the new chain is made up for the most part of ordinary blocks and plates held together with horizontal pintles. No "universal" blocks are used. The flights are configured at one end to form plates, and are used with specially configured blocks as hereinafter described, to coact with the special blocks or links to permit a lateral movement of the blocks. The lengths of chain extending between the points of location of the flights are made up of ordinary blocks and plates with the usual horizontal pintles so as to form sections which are substantially rigid in the horizontal plane. Horizontal flexing of the chain occurs at the points of attachment of the flights.

Figure 1:
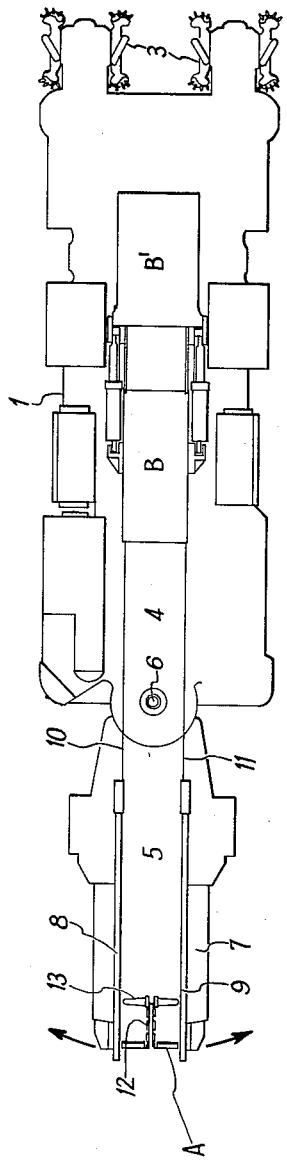
FIG. 1 is a diagrammatic representation of a continuous mining machine of one form, illustrating especially the tail conveyor.
Figure 2:
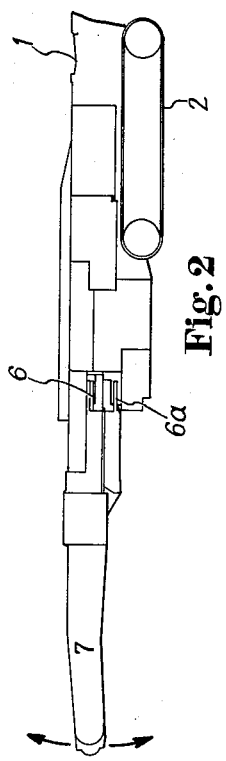
FIG. 2 is a diagrammatic side elevation of the rear part of the same mining machine.

Referring first to FIGS. 1 and 2, a mining machine of typical form is shown as having a body 1 mounted as usual on powered treads 2. Powered cutting means are indicated at the forward end of the machine by the index numeral 3. It will be understood that the cutting heads can be moved as above described, and that the mining machine itself can be driven forwardly in a rectilinear or curved path.

The tail conveyor is indicated as comprising elongated platform elements 4 and 5 which are pivoted together at 6. The portion of the tail conveyor extending rearwardly of the machine has a boom 7 which is pivoted intermediate its length as at 6a and is also pivoted to the mining machine at a point indicated at B so that the boom can be swung from side to side and up and down as indicated by arrows in FIGS. 1 and 2. Rigid flanges for the rearward portion of the platform 5 are indicated at 8 and 9 on the boom. These rigid flanges terminate forwardly in flexible flanges 10 and 11 which are capable of bending to arcuate forms when the boom 7 is swung from side to side. A chain 12 will be understood as traversing the central portion of the platform members 4 and 5, and also as carrying flight elements 13 at intervals along its length. The skilled worker will know that there will be sprockets for the chain located approximately at points marked A and B', and that one or both of these sprockets will be powered in a suitable way.

Suitable power means will be provided for raising and lowering the tail conveyor structure and for swinging it from side to side.

Figure 3:
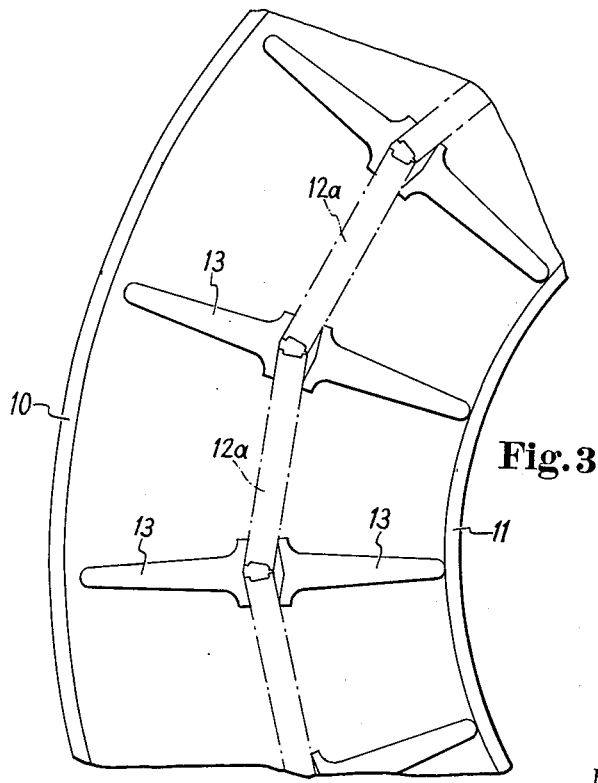
FIG. 3 is a diagrammatic representation of a chain of this invention passing over a platform and between side guides or flanges, the chain following a horizontally curved path.
Figure 10:
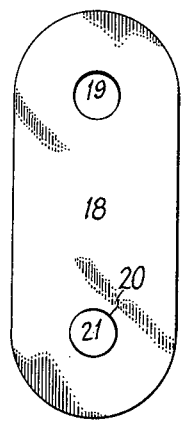
FIGS. 10 and 11 show in elevation and in plan a plate together with a pintle.
Figure 11:
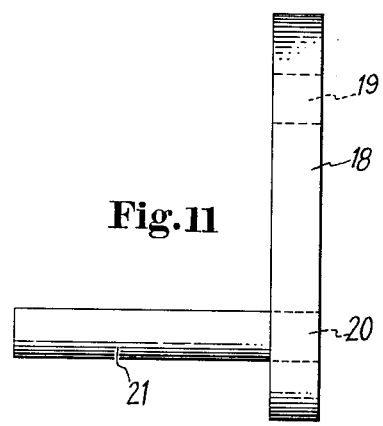
Figure 12:
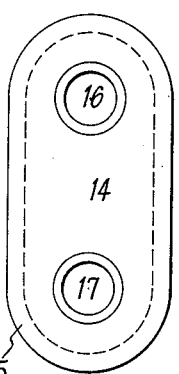
FIGS. 12 and 13 show in plan and in elevation a form of block used with plate elements of FIGS. 10 and 11 in making up that portion of the chain which extends intermediate the flights.
Figure 13:
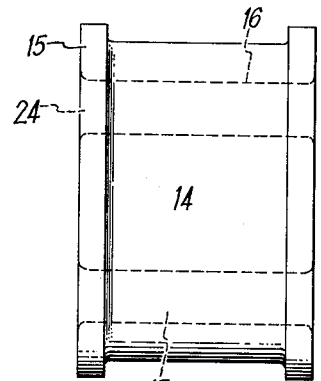

If the boom 7 is swung to one side, the flexible flanges 10 and 11 will assume a curved configuration as shown in FIG. 3. In that figure the chain is diagrammatically shown as consisting of straight sections 12a and flights 13. Flexing of the chain in the horizontal plane will take place by reason of the abutment of the ends of the flights against one or the other of the flexible flanges 10 or 11 depending upon the direction in which the boom is swung.

Figure 14:
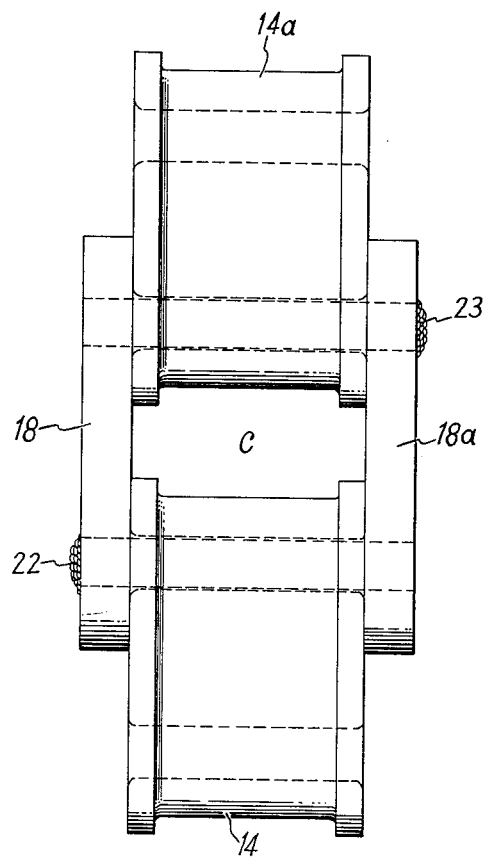
FIG. 14 is a plan view of blocks, plates and pintles forming the above noted portion of the chain.

The straight sections 12a of the chain are made up essentially from the blocks and plates of FIGS. 10 to 13 in the manner shown in FIG. 14. The ordinary blocks are conventional elements 14, usually rounded at their ends and frequently provided with flange-like edges 15. Near each end of each such block or link there is a transverse bore 16 or 17 to receive the horizontal pintles of the chain. The plates are the elements 18 shown in FIGS. 10 and 11. These elements are also rounded at their ends and are bored as at 19 and 20 to receive the pintle elements 21. One of these pintle elements may be formed integrally with or welded to each plate; and in joining two blocks or links 14 and 14a together (see FIG. 14) it will be the usual practice to assemble one of the plates to each of the blocks by passing the plate pintle through an appropriate hole in the block, passing the pintle of the opposite plate through an appropriate hole in the other block, engaging the ends of the pintles in appropriate holes in the respective plate members, and welding the pintle ends to the plates as at 22 and 23. Needless to say the blocks, plates and pintles can be assembled as separate elements and welding done at the ends of each pintle after such assembly. Oher means for holding the pintles to the plates may be employed in lieu of welding. The length of the plates will be such as to provide a space C between the blocks or links of a suitable dimension to receive a tooth of a block chain sprocket. To accommodate the shape of the pintle or to facilitate pintle insertion, it will be possible to radius the ends of the holes 16 and 17 in the blocks as shown at 24 in FIG. 13.

Figure 4:
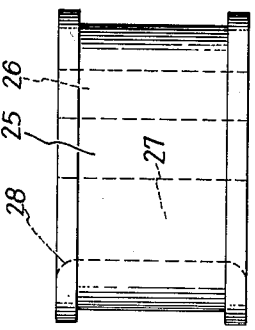
FIGS. 4, 5 and 6 show one form of block for the chain respectively in plan and in end and side elevations.
Figure 6:
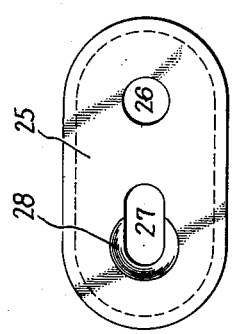
Figure 5:
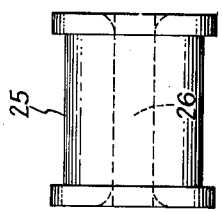

At the ends of each of the straight sections 12a of the chain there will be mounted (in the same fashion) a special block or link member 25 such as is shown in FIGS. 4, 5 and 6. This link member is of the same external size and configuration as the link members 14 and 14a of FIGS. 10 to 14. It will have a perforation 26 to receive the pintle of a pair of plate members located at the end of a straight section 12a. It will also have a perforation 27 of elongated form, as shown, the perforation being radiused at 28.

Figure 7:
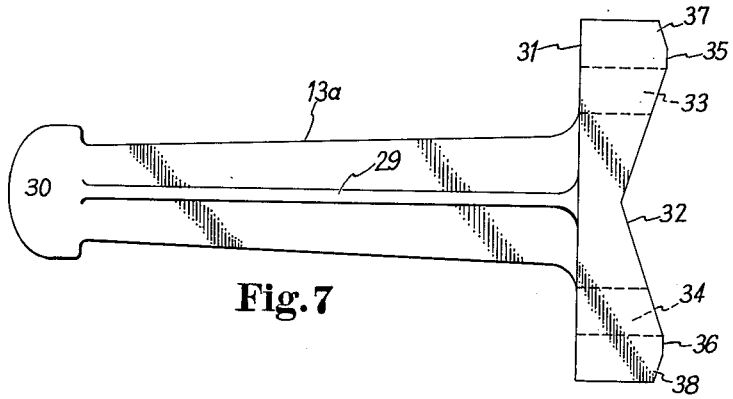
FIGS. 7, 8 and 9 show a flight element respectively in plan, side elevation and end elevation.
Figure 9:
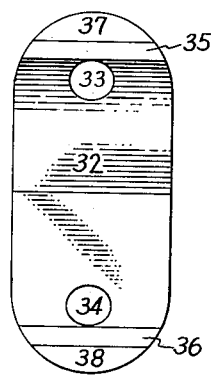
Figure 8:
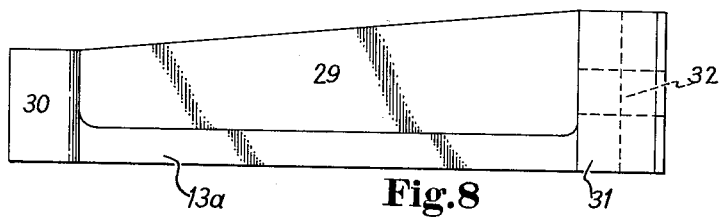

The flight elements are shown in FIGS. 7 to 9. They comprise an arm-like body 13a usually having a central rib 29 acting as a pusher for the coal on the platform. The outer or free ends of the flights having rounded knoblike portions 30 which can ride against the flange elements associated with the platforms of the conveyor as will be apparent from FIG. 3. The opposite ends of the flights are provided with integral plates 31. Each of these plates has a V notch 32 the mid portion of which is located at the center of the plate. The sides of the notch extend to a point substantially coincident with the outer edges of pintle receiving perforations 33 and 34. At this point there occurs a narrow flat 35 or 36. End portions of the plate extending outwardly beyond the flats are chamfered or relieved as at 37 and 38.

Figure 15:
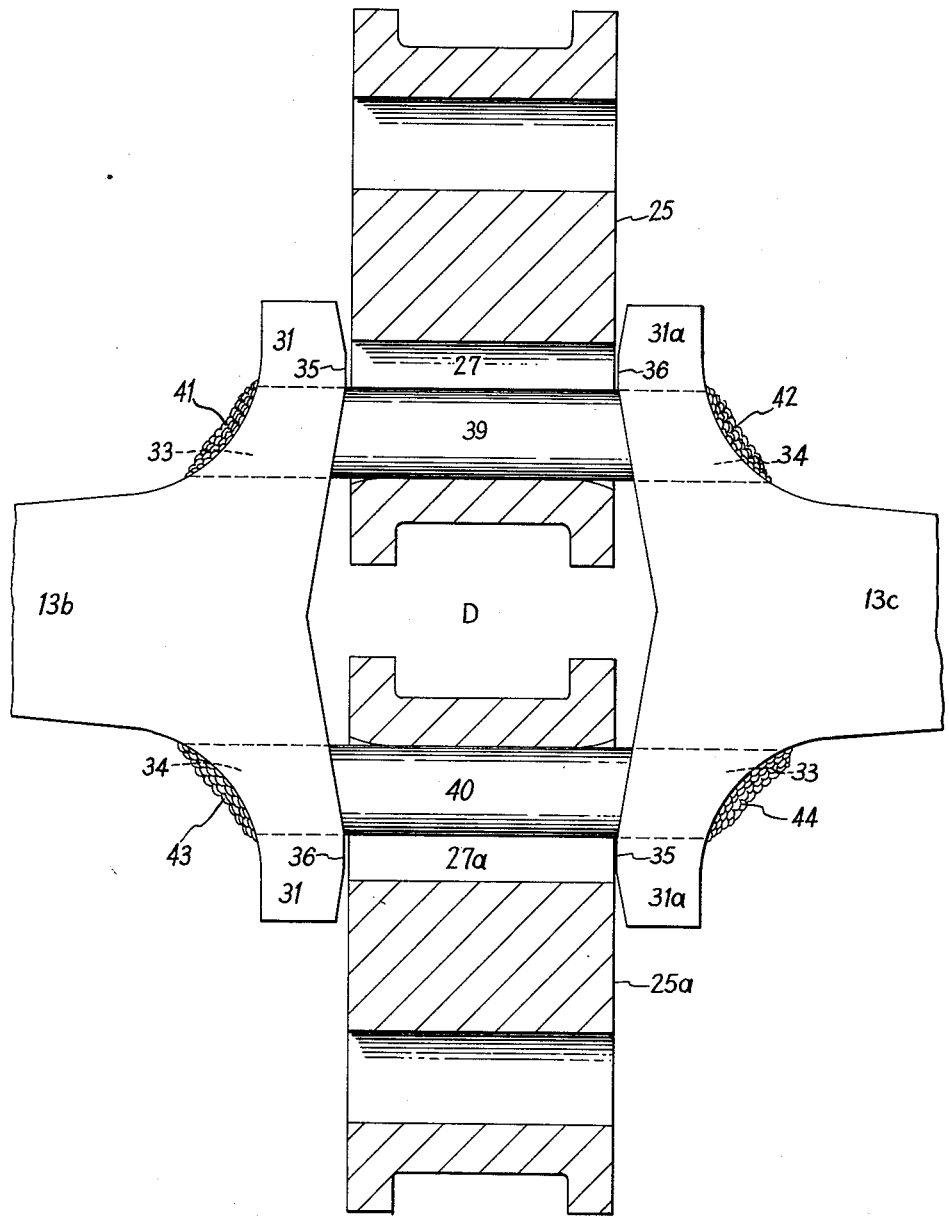
FIG. 15 is a view partially in plan and partially in section showing the coaction of the blocks of FIGS. 4, 5 and 6 with the flights of FIGS. 7, 8 and 9 and the flight pintles.

As shown in FIG. 15, the special blocks or links 25 and 25a are assembled to flights 13a and 13b by means of pintles 39 and 40. These pintles pass through the transversely elongated holes or perforations 27 and 27a in the special blocks, and through the perforations 33 and 34 in the plate members 31a and 31b of the flights. The pintles are welded to the flights as indicated at 41, 42, 43 and 44 in the figure or are otherwise held in place. With the chain parts in the substantially straight condition (in the horizontal plane) as shown in FIG. 15, the flats 35 and 36 approach the outer surfaces of the blocks closely enough to prevent play or lost motion within reasonable tolerances.

Figure 16:
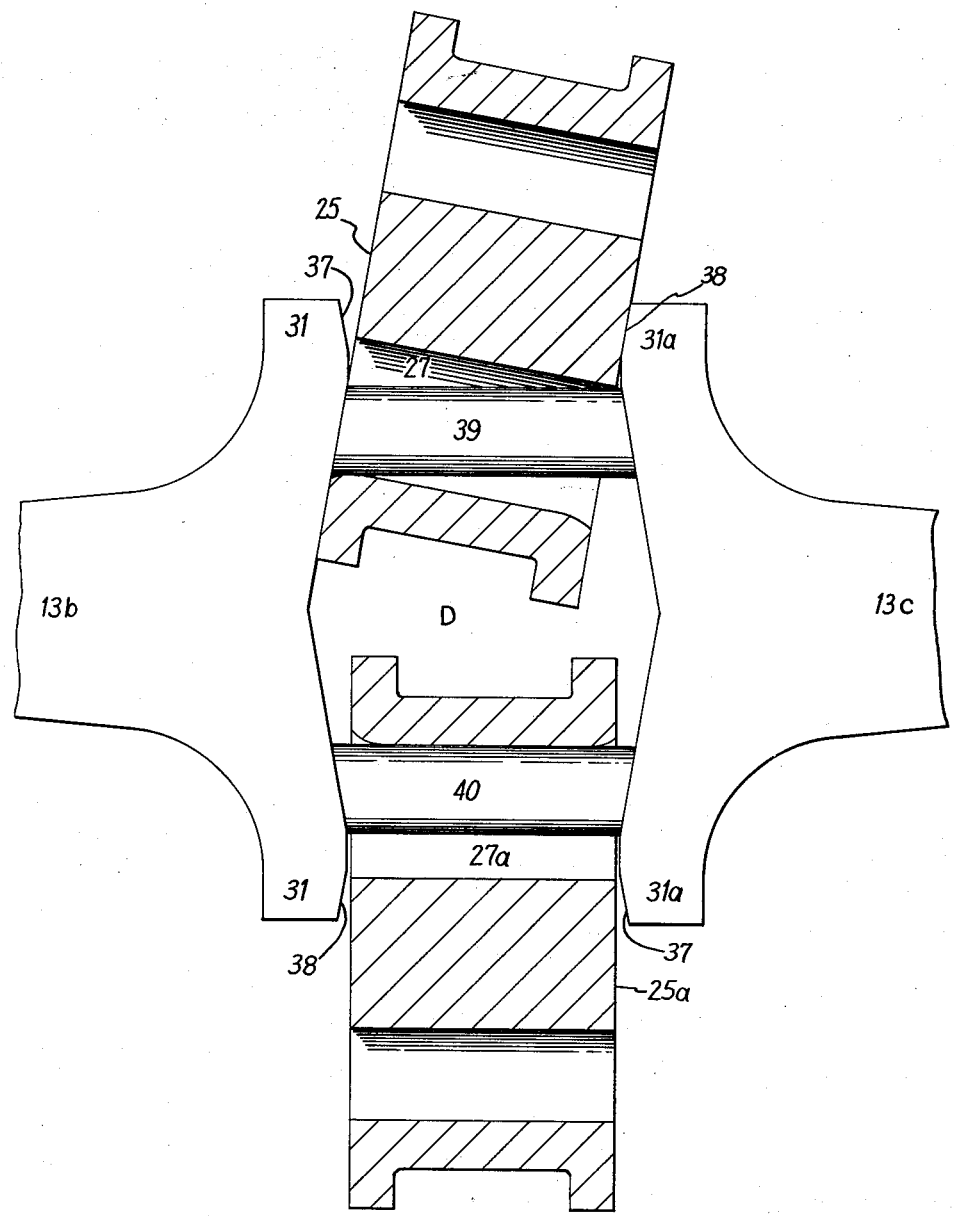
FIG. 16 is a similar view showing the coaction of the same elements during a lateral or horizontal flexure of the chain.

But the construction is such that either of the blocks may be tilted with respect to the plate members 31 and 31a. This is illustrated in FIG. 16, where the block 25 is tilted at a substantial angle to the center line of the flights 13b and 13c. The tilting becomes possible because of (a) the lateral elongation of the hole 27 which permits the pintle 39 to lie aslant therein, (b) the radiusing of the outer edges of the hole 27, (c) the slantwise disposition of an edge of the notch 32 and (d) the chamfering of an end portion of one of the plate members 31 or 31a as at 37. It will be noted that the engagement of the block 25 with the plate elements 31 and 31a is still a snug engagement which eliminates excessive lost motion and consequent wear.

While FIG. 16 does not show the block or link 25a in tilted position, it will be evident that it could assume a tilted position in the same way as has been described in connection with block 25, although the tilting of the block 25a will, in the normal operation of the chain, be of opposite hand. Thus a very substantial flexing of the chain can be accomplished at the position of each pair of flights. Wobbling of the flights at each such position is prevented because (a) the respective blocks or links 25 and 25a maintain a suitable snug engagement with the plate members 31 and 31a as above explained, and (b) the portions 12a of the chain extending between the positions of successive flight pairs are essentially rigid in the horizontal plane as also above set forth.

Figure 17:
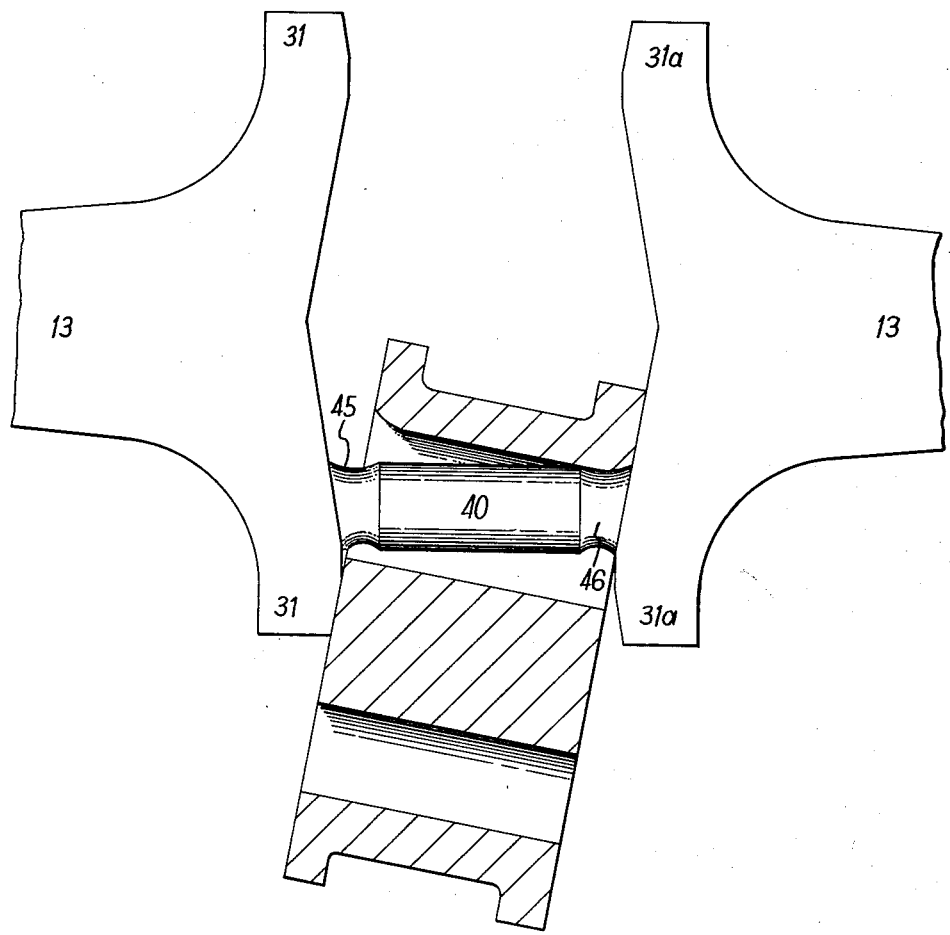
FIG. 17 is a similar view showing a modified form of pintle.

Now, the flexing of the chain in a horizontal plane in the way described will have a tendency to shorten the entire chain length slightly. This shortening is not generally objectionable because it occurs only where the chain is flexed horizontally and is relieved when each flexed section straightens out again. The shortening effect can, however, be partially relieved by undercutting the pintles as shown in FIG. 17 at 45 and 46. Moreover, the effect of the shortening where a plurality of flexing points are involved will be ameliorated by the tendency of the chain to pull to one side against a flexible flange 10 or 11 when making a turn, as is illustrated in FIG. 3. At the ends of the conveyor, where the chain passes over a sprocket, the chain will be in straightened condition as shown in FIG. 15. Thus there will be a space D between the blocks or links 25 and 25a suitable for the reception of a driving tooth of the sprocket.

Modifications may be made in the invention without departing from the spirit of it. The invention having been described in certain exemplary embodiments, what is claimed as new and desired to be secured by Letters Patent is:

1. A conveying chain for mining machines or like uses and of a type having laterally extending flights at intervals for pushing a material to be conveyed along a platform, said chain comprising successive sections made up of blocks, and plates lapping end portions of said blocks, said end portions of said blocks having transverse perforations, pintles passing through said perforations in said blocks and attached to said plates, each of said sections having at each end a terminal block, end portions of said terminal blocks having transverse perforations, and flight elements each having an elongated body extending laterally of the chain and a plate element formed on the end of each such body, the plate elements of opposite flights being held together by pintles passing through one of said perforations in the terminal blocks of successive sections, the last mentioned ones of said perforations being elongated in the direction of the chain axis, whereby the last mentioned pintles are capable of tilting within the last mentioned ones of said perforations, the plate elements of the said flights being located sufficiently close together to minimize lateral lost motion between the said plate elements and the said terminal blocks, the said plate elements of the said flights having a relief with planar surfaces extending at least to the outer portions of the pintles by which the said flight elements are held together to permit a tilting of the said terminal blocks with respect thereto.

2. The structure claimed in claim 1 wherein said relief is in the form of a V-shaped notch.

3. The structure claimed in claim 2 wherein the plate elements of the said flights have narrow transverse flats at the ends of said V shaped notches.

4. The structure claimed in claim 2 wherein the plate elements of the said flights have narrow transverse flats at the ends of said V shaped notches, end portions of the plate elements of said flights extending outwardly beyond said flats being chamfered.

5. The structure claimed in claim 4 wherein the elongated perforations in said terminal blocks are radiused at their ends.

6. The structure claimed in claim 5 wherein the portions of the pintles which maintain the plate elements of said flights in spaced relationship have annular reliefs adjacent said plate elements.

7. A flight element for a conveyor chain for mining machines or like uses comprising an elongated body and a plate element for a conveyor chain formed on the end of said body, having perforations for the reception of pintles by means of which said flight element may be fixed in spaced relationship to another oppositely disposed flight element, the plate element of the claimed flight element having an exposed face, and the said face having a central relief extending at least to the outer sides of the perforations.

8. A flight element for a conveyor chain for mining machines or like uses comprising an elongated body and a plate element for a conveyor chain formed on the end of said body, having perforations for the reception of pintles by means of which said flight element may be fixed in spaced relationship to another oppositely disposed flight element, the plate element of the claimed flight element having an exposed face, and the said face having a central relief extending at least to the outer sides of the perforations, and a transverse flat at the ends of said relief.

9. The structure claimed in claim 8 wherein the ends of said plate elements are chamfered beyond the said flats.

10. A block for a conveying chain for mining machines and like uses, wherein the chain is of a type having successive sections made up of blocks and plates held together by pintles so that the chain sections will flex in one transverse direction but not in the other, and in which the said several sections are fastened together by means permitting flexing in the said other direction, the said claimed block being a terminal block for a chain section and constituting an elongated metallic element having substantially parallel sides and substantially parallel top and bottom portions excepting for rounded configurations at the ends of said element joining said top and bottom portions, said metallic element being of a length to fit between the teeth of a block chain sprocket, said metallic element having near one end a perforation to receive snugly a pintle for fastening said terminal block to a pair of plates, and near its other end a perforation of substantially the same transverse dimension in the top-to-bottom direction, but a transverse dimension in the direction of the length of the metallic element which is substantially elongated, whereby a pintle placed in said last mentioned perforation can be substantially tilted with respect to the axis of said perforation, end portions of said perforation being radiused.

11. A conveying chain for mining machines or like uses and of a type having laterally extending flights at intervals for pushing a material to be conveyed along a platform, said chain comprising successive sections made up of blocks, and plates lapping end portions of said blocks, said end portions of said blocks having transverse perforations, pintles passing through said perforations in said blocks and attached to said plates, each of said sections having at each end a terminal block, end portions of said terminal blocks having transverse perforations, and flight elements each having an elongated body extending laterally of the chain and a plate element formed on the end of each such body, the plate elements of opposite flights being held together by pintles passing through one of said perforations in the terminal blocks of successive sections, the last mentioned ones of said perforations being elongated in the direction of the chain axis whereby the last mentioned pintles are capable of tilting within the last mentioned ones of said perforations, the plate elements of the said flights being located sufficiently close to minimize lateral loose motion between the said plate elements and the said terminal blocks, each of the said plate elements of the said flights having a relief in the form of a V-shaped notch to permit a tilting of the said terminal blocks with respect thereto.

References Cited in the file of this patent

UNITED STATES PATENTS

| | | |
|---|---|---|
| 1,917,134 | Levin | July 4, 1933 |
| 3,093,235 | Imse | June 11, 1963 |